US011873392B2

(12) United States Patent
Minowa et al.

(10) Patent No.: US 11,873,392 B2
(45) Date of Patent: Jan. 16, 2024

(54) POLYPROPYLENE-BASED RESIN COMPOSITION

(71) Applicant: PRIME POLYMER CO., LTD., Tokyo (JP)

(72) Inventors: Akira Minowa, Toyota (JP); Shuichi Takahashi, Ichihara (JP); Yusuke Fukuda, Ichihara (JP); Hiroyuki Ikeno, Wako (JP)

(73) Assignee: PRIME POLYMER CO., LTD., Tokyo (JP)

( * ) Notice: Subject to any disclaimer, the term of this patent is extended or adjusted under 35 U.S.C. 154(b) by 208 days.

(21) Appl. No.: 15/774,822

(22) PCT Filed: Nov. 10, 2016

(86) PCT No.: PCT/JP2016/083400
§ 371 (c)(1),
(2) Date: May 9, 2018

(87) PCT Pub. No.: WO2017/082358
PCT Pub. Date: May 18, 2017

(65) Prior Publication Data
US 2018/0327580 A1 Nov. 15, 2018

(30) Foreign Application Priority Data
Nov. 11, 2015 (JP) ................................. 2015-220960

(51) Int. Cl.
*C08L 23/10* (2006.01)
*C08L 23/08* (2006.01)
*C08K 3/34* (2006.01)
*C08F 210/16* (2006.01)

(52) U.S. Cl.
CPC ............... *C08L 23/10* (2013.01); *C08K 3/34* (2013.01); *C08L 23/0815* (2013.01); *C08F 210/16* (2013.01); *C08F 2500/17* (2013.01); *C08F 2800/20* (2013.01); *C08K 2201/005* (2013.01); *C08K 2201/016* (2013.01); *C08L 2205/025* (2013.01); *C08L 2205/03* (2013.01)

(58) Field of Classification Search
CPC .... C08K 3/34; C08K 3/013; C08K 2201/005; C08K 2201/016; C08L 23/10; C08L 23/0815; C08L 23/12; C08L 53/00; C08L 2205/025; C08L 2205/03; C08F 210/06; C08F 10/06; C08F 4/6545; C08F 4/6492; C08F 2/001; C08F 110/06; C08F 4/651; C08F 2800/20; C08F 2500/17; C08F 210/16; C08F 2500/12; C08F 2500/35; C08F 4/6465
See application file for complete search history.

(56) References Cited

U.S. PATENT DOCUMENTS

| | | | |
|---|---|---|---|
| 5,747,576 A | 5/1998 | Sobajima et al. | |
| 8,193,282 B2 * | 6/2012 | Suzuki | C08L 77/00 525/89 |
| 8,802,779 B2 * | 8/2014 | Okamoto | C08L 23/10 525/240 |
| 2010/0137498 A1 | 6/2010 | Kobayashi et al. | |
| 2010/0311894 A1 | 12/2010 | Tsukahara et al. | |
| 2015/0274948 A1 * | 10/2015 | Fukuda | C08L 23/12 296/193.06 |

FOREIGN PATENT DOCUMENTS

| | | |
|---|---|---|
| JP | H05-51498 A | 3/1993 |
| JP | H05-98128 A | 4/1993 |
| JP | H06-240097 A | 8/1994 |
| JP | H08-3394 A | 1/1996 |
| JP | H09-151294 A | 6/1997 |
| JP | 2000-095919 A | 4/2000 |
| JP | 2007-091789 A | 4/2007 |
| JP | 2009-062526 A | 3/2009 |
| JP | 2010-077396 A | 4/2010 |
| JP | 2013-159709 A | 8/2013 |
| JP | 2014-058614 A | 4/2014 |
| JP | 2014-074102 A | 4/2014 |
| JP | 2015178568 A * | 10/2015 |
| JP | 2016-084386 A | 5/2016 |
| WO | WO-2009/060738 A1 | 5/2009 |

OTHER PUBLICATIONS

English Machine Translation for JP 2015-178568 (Year: 2015).*
Data Sheet for EG8100 (Year: 2016).*
International Search Report with English language translation and Written Opinion issued in International Application No. PCT/JP2016/083400 dated Jan. 24, 2017.

* cited by examiner

*Primary Examiner* — Angela C Scott
(74) *Attorney, Agent, or Firm* — Foley & Lardner LLP

(57) ABSTRACT

Disclosed are a polypropylene-based resin composition comprising 5 to 47 parts by mass of a propylene-based polymer (A) having an MFR of 50 to 150 g/10 min and an amount of a decane-soluble part of 6% by mass or more, 0 to 30 parts by mass of a propylene homopolymer (B) having an MFR of 10 to 500 g/10 min, 23 to 30 parts by mass of an ethylene-α-olefin copolymer (C) which is a random copolymer composed of ethylene and an α-olefin having 4 to 8 carbon atoms, and has a density of 0.850 to 0.890 g/cm$^3$ and an MFR of 0.5 to 30 g/10 min, and 30 to 40 parts by mass of an inorganic filler (D) having an average particle size of over 3.0 μm and less than 5.0 μm [the total amount of the components (A) to (D) is 100 parts by mass]; and an automobile exterior member obtained by injection-molding or press-molding the composition.

7 Claims, No Drawings

POLYPROPYLENE-BASED RESIN COMPOSITION

RELATED APPLICATIONS

The present application claims priority under 37 U.S.C. § 371 to International Patent Application No. PCT/JP2016/083400, filed Nov. 10, 2016, which claims priority to and the benefit of Japanese Patent Application No. 2015-220960, filed on Nov. 11, 2015. The contents of these applications are hereby incorporated by reference in their entireties.

TECHNICAL FIELD

The present invention relates to a polypropylene-based resin composition capable of producing a molded article which is used, for example, for automobile exterior members, has low linear expansion coefficient to obtain high dimension stability, and has excellent surface impact resistance at low temperature.

BACKGROUND ART

A molded article obtained by injection-molding a polypropylene resin composition is being used in various fields such as automobile parts and home electronics parts, because of its excellent mechanical properties and moldability, and further, cost performance which is relatively advantageous as compared with other materials.

In the field of automobile parts, materials having impact resistance improved by adding a rubber component such as an ethylene-propylene copolymer (EPR), an ethylene-butene copolymer (EBR), an ethylene-octene copolymer (EOR), a styrene-butadiene copolymer (SBR) and a polystyrene-ethylene/butene-polystyrene triblock copolymer (SEBS) to polypropylene, materials having rigidity improved by adding an inorganic filler such as talc, mica and glass fiber, and blend polymers endowed with well-balanced mechanical properties by adding a rubber component and an inorganic filler simultaneously are used, in addition to polypropylene used singly.

Recently, a need of development of a material maintaining high mechanical properties (chiefly, rigidity) and excellent in dimension stability (having low linear expansion coefficient) is increasing for the purpose of use as a substitute mainly for a metal material, and development and research for attaining this have come to be carried out. However, a polypropylene molded article has problems such as formation of a clearance in the joint of parts or deterioration of fitting accuracy in assembling parts, that is, aperture quality defect problems, when applied, for example, to the use of an automobile outer panel under the environment where the difference in temperature is large, because the polypropylene molded article generally shows large dimension change (linear expansion coefficient) with temperature.

For improving the dimension stability of a polypropylene molded article, various propylene resin compositions obtained by blending polypropylene with, for example, an inorganic filler typified by talc or an elastomer component are conventionally proposed. Examples thereof are a production method of a low linear expansion material characterized in that a propylene block copolymer containing a crystalline polypropylene having a melt flow rate of 500 g/10 min or more is used together with a low molecular weight polyolefin (Patent Document 1), a resin composition obtained by blending a propylene block copolymer with a specific ethylene-butene-1 copolymer (Patent Document 2), a resin composition characterized in that the compounding ratio of a non-crystalline part to a crystalline part in a propylene block copolymer and the viscosity thereof are prescribed (Patent Document 3), a resin composition characterized in that talc having an average particle diameter of 3 µm or less is used and appearance of painting after injection molding is excellent (Patent Document 4), a resin composition containing talc of specific shape and a propylene-based resin produced with a Ziegler catalyst (Patent Document 5), and a resin composition characterized in that two kinds of propylene block copolymers having different melt flow rates and talc of specific shape are used (Patent Document 6).

However, for realistic use as an automobile material, it is desirable that a molded article excellent in surface impact resistance at low temperature and having more improved dimension stability can be produced economically by a more simplified production method, and from such a point of view, a further improvement is strongly required from the industry.

RELATED ART DOCUMENTS

Patent Documents

Patent Document 1: JP 2010-077396 A
Patent Document 2: JP H5-051498 A
Patent Document 3: JP 2000-095919 A
Patent Document 4: JP 2007-91789 A
Patent Document 5: JP 2013-159709 A
Patent Document 6: JP 2014-58614 A

SUMMARY OF THE INVENTION

Technical Problem

The present invention has been made for solving the problems of the prior art as described above. The present invention has an object of providing a polypropylene-based resin composition capable of producing a molded article which is used, for example, for automobile exterior members, has low linear expansion coefficient to obtain high dimension stability and excellent in surface impact resistance at low temperature.

Solution to Problem

The summary of the present invention is as described below.

[1] A polypropylene-based resin composition comprising
5 to 47 parts by mass of a propylene-based polymer (A) having a melt flow rate (230° C., load 2.16 kg) of 50 to 150 g/10 min and an amount of a decane-soluble part of 6% by mass or more,
0 to 30 parts by mass of a propylene homopolymer (B) having a melt flow rate (230° C., load 2.16 kg) of 10 to 500 g/10 min,
23 to 30 parts by mass of an ethylene-α-olefin copolymer (C) which is a random copolymer composed of ethylene and an α-olefin having 4 to 8 carbon atoms, and has a density of 0.850 to 0.890 g/cm$^3$ and a melt flow rate (230° C., load 2.16 kg) of 0.5 to 30 g/10 min, and
30 to 40 parts by mass of an inorganic filler (D) having an average particle size of over 3.0 µm and less than 5.0 µm
wherein, the total amount of the components (A) to (D) is 100 parts by mass.

[2] The polypropylene-based resin composition according to [1], wherein the propylene-based polymer (A) is a block copolymer obtained from propylene and ethylene and the intrinsic viscosity [η] of the decane-soluble part of the copolymer is 2 to 9 dl/g.

[3] The polypropylene-based resin composition according to [1] or [2], wherein the inorganic filler (D) is talc and its aspect ratio is 3 or more and less than 15.

[4] The polypropylene-based resin composition according to any one of [1] to [3], which further comprises a nucleating agent (E) in an amount of 0.05 to 0.5 parts by mass with respect to 100 parts by mass of the sum of the components (A) to (D).

[5] The polypropylene-based resin composition according to any one of [1] to [4], wherein in Dupont surface impact test according to JISK5600-5-3, the surface impact strength at −40° C. of a test piece composed of a molded article of the polypropylene-based resin composition not having undergone painting is 10 J or more.

[6] The polypropylene-based resin composition according to any one of [1] to [5], which is used for automobile exterior members.

[7] An automobile exterior member obtained by injection-molding or press-molding the polypropylene-based resin composition according to [6].

Advantageous Effect of the Invention

According to the polypropylene-based resin composition of the present invention, a molded article excellent in injection-moldability, excellent in dimension stability, and also excellent in mechanical properties such as rigidity and surface impact resistance under low temperature can be produced. Such a molded article is suitable for various uses such as automobile exterior parts. Additionally, according to the polypropylene-based resin composition of the present invention, a molded article having such excellent properties can be produced economically.

MODE FOR CARRYING OUT THE INVENTION

<Propylene-Based Polymer (A)>

The propylene-based polymer (A) used in the present invention is a propylene-based polymer having a melt flow rate (230° C., load 2.16 kg) of 50 to 150 g/10 min and an amount of a decane-soluble part of 6% by mass or more.

The propylene-based polymer (A) substantially contains 6% by mass or more of a decane-soluble part (a1) and 94% by mass or less of a decane-insoluble part (a2). The decane-insoluble part (a2) is, in general, a component which is insoluble in n-decane solvent at room temperature (23° C.), and usually equivalent to a propylene homopolymer part (propylene homopolymer component) occupying in the propylene-based polymer (A). The decane-soluble part (a1) is equivalent to a part other than the propylene homopolymer part, and preferably a copolymer part composed of propylene and ethylene (ethylene-propylene copolymer component).

The propylene-based polymer (A) usually contains 6% by mass or more of a decane-soluble part (a1) and 94% by mass or less of a decane-insoluble part (a2), preferably contains 6 to 20% by mass of a decane-soluble part (a1) and 80 to 94% by mass of a decane-insoluble part (a2), more preferably contains 6 to 15% by mass of a decane-soluble part (a1) and 85 to 94% by mass of a decane-insoluble part (a2), particularly preferably contains 7 to 12% by mass of a decane-soluble part (a1) and 88 to 93% by mass of a decane-insoluble part (a2), wherein, the sum of the content of (a1) and the content of (a2) is 100% by mass.

The propylene-based polymer (A) is preferably a propylene-based block copolymer obtained from propylene and ethylene. The intrinsic viscosity [η] of the decane-soluble part (A) of this propylene-based block copolymer is preferably 2 to 9 dl/g, more preferably 3 to 8 dl/g.

The melt flow rate (230° C., load 2.16 kg) of the propylene-based polymer (A) is 50 to 150 g/10 min, preferably 50 to 130 g/10 min, more preferably 60 to 120 g/10 min, particularly preferably 70 to 110 g/10 min.

The propylene-based polymer (A) can be produced by publicly known methods. For example, a propylene-based block copolymer is obtained by polymerizing propylene using a catalyst for olefin polymerization containing a solid state titanium catalyst component (I) and an organic metal compound catalyst component (II) explained later, and further copolymerizing propylene and ethylene.

[Solid State Titanium Catalyst Component (I)]

The solid state titanium catalyst component (I) constituting the catalyst for olefin polymerization contains, for example, titanium, magnesium, a halogen and, if necessary, an electron donor. As this solid state titanium catalyst component (I), publicly known components can be used without restriction.

For preparation of the solid state titanium catalyst component (I), a magnesium compound and a titanium compound are used in many examples.

Specific examples of the magnesium compound include halogenated magnesiums such as magnesium chloride and magnesium bromide; alkoxymagnesium halides such as methoxymagnesium chloride, ethoxymagnesium chloride and phenoxymagnesium chloride; alkoxymagnesiums such as ethoxymagnesium, isopropoxymagnesium, butoxymagnesium and 2-ethylhexoxymagnesium; aryloxymagnesiums such as phenoxymagnesium; carboxylates of magnesium such as magnesium stearate. The magnesium compounds may be used each singly, or two or more of them may be used in combination. Further, the magnesium compound may be a complex or composite compound with another metal, or a mixture with another metal compound.

Among these, magnesium compounds containing a halogen are preferable, and halogenated magnesiums, particularly, magnesium chloride is more preferable. In addition, alkoxymagnesiums such as ethoxymagnesium are also preferable. Further, the magnesium compound may be one derived from another substance, for example, a compound obtained by contacting an organic magnesium compound with, for example, halogenated titanium, halogenated silicon or halogenated alcohol, such as a Grignard reagent.

As the titanium compound, for example, tetravalent titanium compounds represented by the following formula are given.

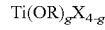

$$Ti(OR)_gX_{4-g}$$

wherein, R is a hydrocarbon group, X is a halogen atom, and $0 \leq g \leq 4$.

Specific examples of the titanium compound include tetrahalogenated titaniums such as $TiCl_4$ and $TiBr_4$; trihalogenated alkoxytitaniums such as $Ti(OCH_3)Cl_3$, $Ti(OC_2H_5)Cl_3$, $Ti(O\text{-}n\text{-}C_4H_9)Cl_3$, $Ti(OC_2H_5)Br_3$ and $Ti(O\text{-}iC_4H_9)Br_3$; dihalogenated alkoxytitaniums such as $Ti(OCH_3)_2Cl_2$ and $Ti(OC_2H_5)_2Cl_2$; monohalogenated alkoxytitaniums such as $Ti(OCH_3)_3Cl$, $Ti(On\text{-}C_4H_9)_3Cl$ and $Ti(OC_2H_5)_3Br$; tetraalkoxytitaniums such as $Ti(OCH_3)_4$, $Ti(OC_2H_5)_4$, $Ti(OC_4H_9)_4$ and $Ti(O\text{-}2\text{-ethylhexyl})_4$. The titanium compounds may be used each singly, or two or more of them may be used in combination. Among these, tetrahalogenated titaniums are preferable, and titanium tetrachloride is more preferable.

As the magnesium compound and the titanium compound, for example, compounds described in detail, for example, in JP S57-63310 A and JP H5-170843 A can also be used.

Specific examples of the preferable preparation method of the solid state titanium catalyst component (I) used in the present invention include the following methods (P-1) to (P-4).

(P-1) A method in which a solid state adduct composed of a magnesium compound and an electron donor component (1) such as an alcohol, an electron donor component (2) described later, and a liquid state titanium compound are brought into contact in the coexistence of an inactive hydrocarbon solvent in suspended condition.

(P-2) A method in which a solid state adduct composed of a magnesium compound and an electron donor component (1), an electron donor component (2), and a liquid state titanium compound are brought into contact several times.

(P-3) A method in which a solid state adduct composed of a magnesium compound and an electron donor component (1), an electron donor component (2), and a liquid state titanium compound are brought into contact in the coexistence of an inactive hydrocarbon solvent in suspended condition, and brought into contact several times.

(P-4) A method in which a liquid state magnesium compound composed of a magnesium compound and an electron donor component (1), a liquid state titanium compound, and an electron donor component (2) are brought into contact.

The reaction temperature in preparing the solid state titanium catalyst component (I) is preferably −30 to 150° C., more preferably −25 to 130° C., particularly preferably −25 to 120° C.

Preparation of the solid state titanium catalyst component (I) can also be conducted in the presence of a publicly known medium as needed. Specific examples of the medium include aromatic hydrocarbons having weak polarity such as toluene, publicly known aliphatic hydrocarbon or alicyclic hydrocarbon compounds such as heptane, octane, decane and cyclohexane. Among these, aliphatic hydrocarbons are preferable.

As the electron donor component (1) used for formation of the solid state adduct and the liquid state magnesium compound, publicly known compounds capable of solubilizing a magnesium compound in a temperature range from room temperature to about 300° C. are preferable, and for example, alcohols, aldehydes, amines, carboxylic acids and mixtures thereof, are preferable. As these compounds, for example, compounds described in P S57-63310 A and JP H5-170843 A are given.

Specific examples of the alcohol capable of solubilizing a magnesium compound include aliphatic alcohols such as methanol, ethanol, propanol, butanol, isobutanol, ethylene glycol, 2-methylpentanol, 2-ethylbutanol, n-heptanol, n-octanol, 2-ethylhexanol, decanol and dodecanol; alicyclic alcohols such as cyclohexanol and methylcyclohexanol; aromatic alcohols such as benzylalcohol and methylbenzylalcohol; aliphatic alcohols having an alkoxy group such as n-butyl cellosolve.

Specific examples of the carboxylic acid include organic carboxylic acids having 7 or more carbon atoms such as caprylic acid and 2-ethylhexanoic acid. Specific examples of the aldehyde include aldehydes having 7 or more carbon atoms such as capric aldehyde and 2-ethylhexyl aldehyde. Specific examples of the amine include amines having 6 or more carbon atoms such as heptylamine, octylamine, nonylamine, laurylamine and 2-ethylhexylamine.

As the electron donor component (1), alcohols described above are preferable, and particularly, ethanol, propanol, butanol, isobutanol, hexanol, 2-ethylhexanol, decanol are preferable.

The composition ratio of magnesium of the resultant solid state adduct and liquid state magnesium compound to the electron donor component (1) cannot be specified unconditionally since it varies depending on the kind of the compound to be used, and the amount of the electron donor component (1) is preferably 2 mol or more, more preferably 2.3 mol or more, particularly preferably 2.7 mol or more, and 5 mol or less with respect to 1 mol of magnesium in the magnesium compound.

As particularly preferable examples of the electron donor which is used as needed in the solid state titanium catalyst component (I), aromatic carboxylic acid esters and/or compounds having 2 or more ether bonds via a plurality of carbon atoms (hereinafter, referred to as "electron donor component (2)") are given.

As this electron donor component (2), publicly known aromatic carboxylic acid esters and polyether compounds conventionally preferably used in a catalyst for olefin polymerization, for example, compounds described in JP H5-170843 A and JP 2001-354714 A can be used without restriction.

As the aromatic carboxylic acid ester, specifically, aromatic carboxylic acid monoesters such as benzoic acid esters and toluylic acid esters, and additionally, aromatic polyvalent carboxylic acid esters such as phthalic acid esters are given. Among these, aromatic polyvalent carboxylic acid esters are preferable, phthalic acid esters are more preferable. As the phthalic acid esters, phthalic acid alkyl esters such as ethyl phthalate, n-butyl phthalate, isobutyl phthalate, hexyl phthalate and heptyl phthalate are preferable, diisobutyl phthalate is particularly preferable.

As the polyether compound, specifically, compounds represented by the following chemical structural formula (1) are given.

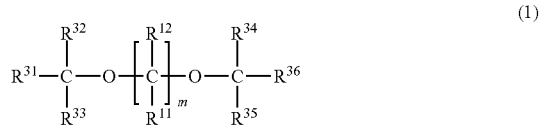

(1)

In the above-described formula (1), m is an integer of 1≤m≤10, more preferably an integer of 3≤m≤10, $R^{11}$ to $R^{36}$ are independently a hydrogen atom, or a substituent having at least one element selected from carbon, hydrogen, oxygen, fluorine, chlorine, bromine, iodine, nitrogen, sulfur, phosphorus, boron and silicone. When m is 2 or more, a plurality of $R^{11}$s and $R^{12}$s may be the same or different. Arbitrary $R^{11}$ to $R^{36}$, preferably $R^{11}$ and $R^{12}$, may be bonded with each other to form a ring other than a benzene ring.

Specific examples of such compounds include monosubstituted dialkoxypropanes such as 2-isopropyl-1,3-dimethoxypropane, 2-s-butyl-1,3-dimethoxypropane and 2-cumyl-1,3-dimethoxypropane; di-substituted dialkoxypropanes such as 2-isopropyl-2-isobutyl-1,3-dimethoxypropane, 2,2-dicyclohexyl-1,3-dimethoxypropane, 2-methyl-2-isopropyl-1,3-dimethoxypropane, 2-methyl-2-cyclohexyl-1,3-dimethoxypropane, 2-methyl-2-isobutyl-1,3-dimethoxypropane, 2,2-diisobutyl-1,3-dimethoxypropane, 2,2-bis(cyclohexylmethyl)-1,3-dimethoxypropane, 2,2-diisobutyl-1,3-diethoxypropane, 2,2-diisobutyl-1,3-dibutoxypropane, 2,2-di-s-butyl-1,3-dimethoxypropane, 2,2-dineopentyl-1,3-dimethoxypropane, 2-isopropyl-2-isopentyl-1,3-dimethoxypropane and 2-cyclohexyl-2-cyclohexylmethyl-1,3-dimethoxypropane; dialkoxyalkanes such as 2,3-dicyclohexyl-1,4-diethoxybutane, 2,3-dicyclohexyl-1,4-diethoxybutane, 2,3-diisopropyl-1,4-diethoxybutane, 2,4-diphenyl-1,5-dimethoxypentane, 2,5-diphenyl-1,5-dimethoxyhexane, 2,4-diisopropyl-1,5-dimethoxypentane, 2,4-diisobutyl-1,5-dimethoxypentane and 2,4-diisoamyl-1,5-dimethoxypentane; trialkoxyalkanes such as 2-methyl-2-methoxymethyl-1,3-dimethoxypropane, 2-cyclohexyl-2-ethoxymethyl-1,3-diethoxypropane and 2-cyclohexyl-2-methoxymethyl-1,3-dimethoxypropane. The polyether compounds may be used each singly, or two or more of them may be used in combination. Among these, 1,3-diethers are preferable, and particularly, 2-isopropyl-2-isobutyl-1,3-dimethoxypropane, 2,2-diisobutyl-1,3-dimethoxypropane, 2-isopropyl-2-isopentyl-1,3-dimethoxypropane, 2,2-dicyclohexyl-1,3-dimethoxypropane and 2,2-bis(cyclohexylmethyl)1,3-dimethoxypropane are preferable.

In the solid state titanium catalyst component (I), the halogen/titanium (atomic ratio) (namely, the number of moles of a halogen atom/the number of moles of a titanium atom) is 2 to 100, preferably 4 to 90, the electron donor component (1)/titanium atom (molar ratio) is 0 to 100, preferably 0 to 10, and the electron donor component (2)/titanium atom (molar ratio) is 0 to 100, preferably 0 to 10. The magnesium/titanium (atomic ratio) (namely, the number of moles of a magnesium atom/the number of moles of a titanium atom) is 2 to 100, preferably 4 to 50.

As more detailed preparation conditions of the solid state titanium catalyst component (I), conditions described, for example, in EP585869A1 and JP H5-170843 A can be suitably used, in addition to use of the electron donor component (2).

[Organic Metal Compound Catalyst Component (II)]

The organic metal compound catalyst component (II) is a component containing a metal element selected from the $1^{st}$ group, the $2^{nd}$ group and the $13^{th}$ group of the periodic table. For example, compounds containing a metal of the $13^{th}$ group (for example, organic aluminum compound), complex alkylated compounds composed of a metal of the $1^{st}$ group and aluminum, and organic metal compounds of a metal of the $2^{nd}$ group can be used. Among these, organic aluminum compounds are preferable.

As the organic metal compound catalyst component (II), specifically, organic metal compound catalyst components described in publicly known literatures such as EP585869A1 can be suitably used.

As far as the object of the present invention is not impaired, publicly known electron donor components (3) may also be used in combination with the electron donor component (1) and the electron donor component (2) explained above.

As the electron donor component (3), organic silicon compounds are preferable. This organic silicon compound is, for example, a compound represented by the following formula.

$R_nSi(OR')_{4-n}$ wherein, R and R' are independently a hydrocarbon group and n is an integer of 0<n<4.

As specific examples of the organic silicon compound represented by the above-described formula, diisopropyldimethoxysilane, t-butylmethyldimethoxysilane, t-butylmethyldiethoxysilane, t-amylmethyldiethoxysilane, dicyclohexyldimethoxysilane, cyclohexylmethyldimethoxysilane, cyclohexylmethyldiethoxysilane, vinyltrimethoxysilane, vinyltriethoxysilane, t-butyltriethoxysilane, phenyltriethoxysilane, diphenyldimethoxysilane, cyclohexyltrimethoxysilane, cyclopentyltrimethoxysilane, 2-methylcyclopentyltrimethoxysilane, cyclopentyltriethoxysilane, dicyclopentyldimethoxysilane, dicyclopentyldiethoxysilane, tricyclopentylmethoxysilane, dicyclopentylmethylmethoxysilane, dicyclopentylethylmethoxysilane and cyclopentyldimethylethoxysilane are used. Among these, vinyltriethoxysilane, diphenyldimethoxysilane, dicyclohexyldimethoxysilane, cyclohexylmethyldimethoxysilane and dicyclopentyldimethoxysilane are preferable.

Further, silane compounds represented by the following formula described in International Publication WO2004/016662 pamphlet are also preferable examples of the organic silicon compound.

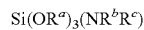

$Si(OR^a)_3(NR^bR^c)$

In the above-described formula, $R^a$ is a hydrocarbon group having 1 to 6 carbon atoms. For example, unsaturated or saturated aliphatic hydrocarbon groups having 1 to 6 carbon atoms are given, and particularly, hydrocarbon groups having 2 to 6 carbon atoms are preferable. As specific examples thereof, a methyl group, an ethyl group, a n-propyl group, an iso-propyl group, a n-butyl group, an iso-butyl group, a sec-butyl group, a n-pentyl group, an iso-pentyl group, a cyclopentyl group, a n-hexyl group and a cyclohexyl group are given. Among these, an ethyl group is particularly preferable.

$R^b$ is a hydrocarbon group having 1 to 12 carbon atoms or hydrogen. For example, it is an unsaturated or saturated aliphatic hydrocarbon group having 1 to 12 carbon atoms or hydrogen. As specific examples, a hydrogen atom, a methyl group, an ethyl group, a n-propyl group, an iso-propyl group, a n-butyl group, an iso-butyl group, a sec-butyl group, a n-pentyl group, an isopentyl group, a cyclopentyl group, a n-hexyl group, a cyclohexyl group and an octyl group are given. Among these, an ethyl group is particularly preferable.

$R^c$ is a hydrocarbon group having 1 to 12 carbon atoms. For example, it is an unsaturated or saturated aliphatic hydrocarbon group having 1 to 12 carbon atoms. As specific examples thereof, a methyl group, an ethyl group, a n-propyl group, an iso-propyl group, a n-butyl group, an iso-butyl group, a sec-butyl group, a n-pentyl group, an iso-pentyl group, a cyclopentyl group, a n-hexyl group, a cyclohexyl group and an octyl group are given. Among these, an ethyl group is particularly preferable.

As specific examples of the organic silicon compound represented by the above-described formula, dimethylaminotriethoxysilane, diethylaminotriethoxysilane, diethylaminotrimethoxysilane, diethylaminotri-n-propoxysilane, di-n-propylaminotriethoxysilane, methyl-n-propylaminotriethoxysilane, t-butylaminotriethoxysilane, ethyl-n-propylaminotriethoxysilane, ethyl-isopropylaminotriethoxysilane and methylethylaminotriethoxysilane are given.

Further, as other examples of the organic silicon compound, compounds represented by the following formula are also given.

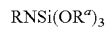

$RNSi(OR^a)_3$

In the above-described formula, RN is a cyclic amino group. As specific examples thereof, a perhydroquinolino group, a perhydroisoquinolino group, a 1,2,3,4-tetrahydroquinolino group, a 1,2,3,4-tetrahydroisoquinolino group and an octamethyleneimino group are given. $R^a$ is the same as described above.

As specific examples of the organic silicon compound represented by the above-described formula, (per-hydroquinolino)triethoxysilane, (perhydroisoquinolino)triethoxysilane, (1,2,3,4-tetrahydroquinolino)triethoxysilane, (1,2,3,4-tetrahydroisoquinolino)triethoxysilane and octamethyleneiminotriethoxysilane are given.

Two or more of the organic silicon compounds explained above may be used in combination.

[Polymerization]

The propylene-ethylene block copolymer as a preferable embodiment of the propylene-based polymer (A) can be produced by a method in which propylene is polymerized in the presence of the catalyst for olefin polymerization described above, then, propylene and ethylene are copolymerized, or a method in which propylene is polymerized in the presence of a pre-polymerization catalyst obtained by pre-polymerization, then, propylene and ethylene are copolymerized.

Pre-polymerization is conducted by pre-polymerizing an olefin in an amount of usually 0.1 to 1000 g, preferably 0.3 to 500 g, particularly preferably 1 to 200 g with respect to 1 g of the catalyst for olefin polymerization. In pre-polymerization, a catalyst of higher concentration than the concentration of a catalyst in the system of main polymerization can be used.

The concentration of the solid state titanium catalyst component (I) in pre-polymerization is usually 0.001 to 200 mmol, preferably 0.01 to 50 mmol, more preferably 0.1 to 20 mmol, in terms of titanium atom, with respect to 1 liter of a liquid medium.

The amount of the organic metal compound catalyst component (II) in pre-polymerization may be such an amount that a polymer is generated in an amount of usually 0.1 to 1000 g, preferably 0.3 to 500 g with respect to 1 g of the solid state titanium catalyst component (I), and is usually 0.1 to 300 mol, preferably 0.5 to 100 mol, more preferably 1 to 50 mol with respect to 1 mol of a titanium atom in the solid state titanium catalyst component (I).

In pre-polymerization, the above-described electron donor components can also be used as needed, and in this case, the amount of these components is usually 0.1 to 50 mol, preferably 0.5 to 30 mol, more preferably 1 to 10 mol with respect to 1 mol of a titanium atom in the solid state titanium catalyst component (I).

The pre-polymerization can be conducted under mild conditions by adding an olefin and the above-described catalyst components to an inactive hydrocarbon medium. In the case of use of an inactive hydrocarbon medium, pre-polymerization is preferably conducted in batch mode.

As specific examples of the inactive hydrocarbon medium, aliphatic hydrocarbons such as propane, butane, pentane, hexane, heptane, octane, decane, dodecane and kerosene; alicyclic hydrocarbons such as cyclopentane, methylcyclopentane, cyclohexane, cycloheptane, methylcycloheptane and cyclooctane; aromatic hydrocarbons such as benzene, toluene and xylene; halogenated hydrocarbons such as ethylene chloride and chlorobenzene; or mixtures thereof are given. Among these, aliphatic hydrocarbons are preferable.

It is also possible to conduct pre-polymerization using an olefin itself as a solvent. Further, it is also possible to conduct pre-polymerization substantially in the absence of a solvent. In this case, it is preferable that pre-polymerization is conducted continuously.

The olefin used in pre-polymerization may be the same as or different from the olefin used in main polymerization described later. As the olefin, propylene is particularly preferable.

The temperature in pre-polymerization is usually −20 to 100° C., preferably −20 to 80° C., more preferably 0 to 40° C.

Next, main polymerization which is carried out after pre-polymerization or without pre-polymerization will be illustrated.

Main polymerization is divided into a step of producing a propylene homopolymer component and a step of producing a propylene-ethylene copolymer component.

Main polymerization (and pre-polymerization) can be carried out by any of a liquid-phase polymerization method such as bulk polymerization, solution polymerization and suspension polymerization, or a vapor-phase polymerization method. As the step of producing a propylene homopolymer component, a liquid-phase polymerization method such as bulk polymerization and suspension polymerization or a vapor-phase polymerization method is preferable. As the step of producing a propylene-ethylene copolymer component, a liquid-phase polymerization method such as bulk polymerization and suspension polymerization or a vapor-phase polymerization method is preferable, and a vapor-phase polymerization method is more preferable.

When main polymerization takes the reaction form of slurry polymerization, an inactive hydrocarbon used in the above-described pre-polymerization or an olefin which is liquid under the reaction temperature and the reaction pressure can be used as the reaction solvent.

In main polymerization, the solid state titanium catalyst component (I) is used in an amount of usually 0.0001 to 0.5 mmol, preferably 0.005 to 0.1 mmol, in terms of a titanium atom, with respect to 1 liter of the polymerization volume. The organic metal compound catalyst component (II) is used in an amount of usually 1 to 2000 mol, preferably 5 to 500 mol with respect to 1 mol of a titanium atom in the pre-polymerization catalyst component in the polymerization system. When the electron donor component is used, it is used in an amount of usually 0.001 to 50 mol, preferably 0.01 to 30 mol, more preferably 0.05 to 20 mol with respect to 1 mol of the organic metal compound catalyst component (II).

If main polymerization is conducted in the presence of hydrogen, the molecular weight of the resultant polymer can be controlled (decreased), and a polymer having large melt flow rate (MFR) is obtained. The amount of hydrogen necessary for controlling the molecular weight varies depending on the kind of the production process to be used, the polymerization temperature and the pressure, therefore, it may be advantageously adjusted.

In the step of producing a propylene homopolymer component, MFR can be controlled by adjusting the polymerization temperature and the hydrogen amount. Also in the step of producing a propylene-ethylene copolymer component, the intrinsic viscosity can be controlled by adjusting the polymerization temperature, the pressure and the hydrogen amount.

In main polymerization, the olefin polymerization temperature is usually 0 to 200° C., preferably 30 to 100° C., more preferably 50 to 90° C. The pressure (gauge pressure)

is usually ordinary pressure to 100 kgf/cm² (9.8 MPa), preferably 2 to 50 kgf/cm² (0.20 to 4.9 MPa).

In production of the propylene-ethylene block copolymer as a preferable embodiment of the propylene-based polymer (A), polymerization can be conducted by any of a batch-wise method, a semi-continuous method or a continuous method. Further, the form of a reaction apparatus may be any of tube or tank. Further, polymerization can also be conducted in two or more stages under changed reaction conditions. In this case, the tube form and the tank form may be combined.

For obtaining the propylene-ethylene copolymer part in the propylene-ethylene block copolymer as a preferable embodiment of the propylene-based polymer (A), the ethylene/(ethylene+propylene) gas ratio is controlled in polymerization step 2 described later. The ethylene/(ethylene+propylene) gas ratio is usually 5 to 80 mol %, preferably 10 to 70 mol %, more preferably 15 to 60 mol %.

As described previously, the decane-insoluble part (a2) of the propylene-ethylene block copolymer is constituted mainly of a propylene homopolymer component. In contrast, the decane-soluble part (a1) is constituted mainly of an ethylene-propylene copolymer component as a rubber-like component. For example, the propylene-ethylene block copolymer as a preferable embodiment of the propylene-based polymer (A) is obtained by continuously carrying out the following two polymerization steps 1 and 2.

(Polymerization Step 1)

A step of polymerizing propylene in the presence of a solid state titanium catalyst component, to produce a propylene homopolymer component (propylene homopolymer production step).

(Polymerization Step 2)

A step of copolymerizing propylene and ethylene in the presence of a solid state titanium catalyst component, to produce an ethylene-propylene copolymer component (copolymer rubber production step).

Particularly, it is more preferable that polymerization step 1 is conducted in the former stage and polymerization step 2 is conducted in the latter stage. Polymerization steps 1 and 2 can also be conducted using two or more polymerization tanks. The content of the decane-soluble part (a1) can be controlled by the polymerization time (residence time) of polymerization step 1 and polymerization step 2. Polymerization step 1 in the former stage may be conducted by two or more serially connected polymerization apparatuses. In this case, the ratio of propylene to hydrogen in each stage may vary for every polymerization apparatus.

<Propylene Homopolymer (B)>

The propylene homopolymer (B) used in the present invention is a propylene homopolymer having a melt flow rate (230° C., load 2.16 kg) of 10 to 500 g/10 min.

The propylene homopolymer (B) may be a polymer obtained by polymerizing substantially only propylene. For example, a homopolymer obtained by polymerizing only propylene, or a crystalline polymer obtained by copolymerizing propylene and 6 mol % or less, preferably 3 mol % or less of another α-olefin can be used. Among these, a homopolymer obtained by polymerizing only propylene is preferable.

The propylene homopolymer (B) can be produced by polymerizing monomers consisting mainly of propylene by a publicly known method. For example, it is obtained by polymerizing monomers consisting mainly of propylene in the presence of a catalyst for olefin polymerization containing the solid state titanium catalyst component (I) and the organic metal compound catalyst component (II) explained above, or a combined catalyst usually called a Ziegler Natta type catalyst composed of titanium trichloride and an alkylaluminum compound. The polymerization reaction may be conducted in continuous mode or batch mode. Further, for example, it can be suitably produced by conducting only polymerization step 1 explained previously.

In the polymerization reaction, the polymerization temperature is usually 0 to 200° C., preferably 30 to 100° C., more preferably 50 to 90° C. The pressure (gauge pressure) is usually ordinary pressure to 100 kgf/cm² (9.8 MPa), preferably 2 to 50 kgf/cm² (0.20 to 4.9 MPa).

The melt flow rate (230° C., load 2.16 kg) of the propylene homopolymer (B) is 10 to 500 g/10 min, preferably 10 to 300 g/10 min, more preferably 20 to 250 g/10 min.

As the propylene homopolymer (B), one kind of propylene homopolymer may be used, or two or more kinds of propylene homopolymers may be arbitrarily combined in a range satisfying the above-described melt flow rate.

<Ethylene-α-Olefin Copolymer (C)>

The ethylene-α-olefin copolymer (C) used in the present invention is an ethylene-α-olefin copolymer which is a random copolymer composed of ethylene and an α-olefin having 4 to 8 carbon atoms, and has a density of 0.850 to 0.890 g/cm³ and a melt flow rate (230° C., load 2.16 kg) of 0.5 to 30 g/10 min. This ethylene-α-olefin copolymer (C) is expected to contribute to improvement of dimension stability (lowering of linear expansion coefficient) of a molded article by an synergistic effect with other components, and contributes to improvement of other physical properties, thereby giving good balance of physical properties to the molded article.

The α-olefin having 4 to 8 carbon atoms constituting the ethylene-α-olefin copolymer (C) is preferably 1-butene, 1-hexene or 1-octene. The α-olefins may be used each singly, or two or more of them may be used in combination. As the ethylene-α-olefin copolymer (C), particularly, an ethylene-octene copolymer and an ethylene-butene copolymer are preferable.

The melt flow rate (230° C., load 2.16 kg) of the ethylene-α-olefin copolymer (C) is 0.5 to 30 g/10 min, preferably 1 to 25 g/10 min, more preferably 2 to 20 g/10 min. When the melt flow rate is 0.5 g/10 min or more, lowering of flowability of the polypropylene-based resin composition and dispersion defect in kneading hardly occur, and lowering of physical properties such as impact resistance and deterioration of appearance of the surface of a molded article tend to scarcely occur. When the melt flow rate is 30 g/10 min or less, a molded article tends to have sufficient impact resistance.

The density of the ethylene-α-olefin copolymer (C) is 0.850 to 0.890 g/cm³, preferably 0.850 to 0.880 g/cm³, more preferably 0.855 to 0.875 g/cm³.

<Inorganic Filler (D)>

The inorganic filler (D) used in the present invention is an inorganic filler having an average particle size of over 3.0 μm and less than 5.0 μm.

As specific examples of the inorganic filler (D), talc, calcium carbonate, natural mica, synthetic mica, wollastonite and montmorillonite are given. The inorganic fillers (D) may be used each singly, or two or more of them may be used in combination. Among these, talc is preferable.

The average particle diameter of the inorganic filler (D) is over 3.0 μm and less than 5.0 μm, preferably 3.2 μm to 4.9 μm, more preferably 3.3 to 4.9 μm, particularly preferably 3.4 to 4.8 μm. By using the inorganic filler (D) having such an average particle diameter, mechanical properties of a molded article are improved. This average particle diameter is a value measured by a laser diffraction method. Specifically, it is the particle diameter at an integrated value of 50% in particle size distribution measured by particle size distribution meters such as a laser diffraction scattering mode particle size distribution meter, and as the measuring apparatus, for example, MT3300EXII manufactured by Microtrac and type LA-920 manufactured by Horiba, Ltd., are given.

The aspect ratio of the inorganic filler (D) is not particularly restricted, and it is usually 3 or more and less than 15, preferably 4 to 13, more preferably 5 to 11. In general, the aspect ratio is a value showing the ratio of long diameter to thickness of a filler, or the ratio of long side to short side. When this aspect ratio is 3 or more, rigidity and dimension stability of a molded article tend to hardly lower. When it is less than 15, balance of mechanical properties hardly lowers, and further, impact resistance strength tends to scarcely lower. Specifically, this aspect ratio is a value determined by photographing a powder using an electronic microscope, measuring long diameter and thickness of the powder, calculating the average values thereof, and determining the ratio of average particle diameter/average thickness.

The inorganic filler (D) contributes to improvement of dimension stability (lowering of linear expansion coefficient) of a molded article, and contributes to improvement of mechanical properties such as rigidity and impact resistance strength. When the inorganic filler (D) has the above-described specific average particle diameter (and aspect ratio), particularly excellent dimension stability is obtained and good balance of physical properties excellent in rigidity and impact resistance strength is manifested, by a synergistic effect with other components.

As the inorganic filler (D), inorganic fillers in any form such as particle, plate, rod, fiber and whisker can be used. Further, inorganic fillers marketed as a filler for polymer can be used. In addition to general fillers in the form of powder or roving, for example, fillers having enhanced handling convenience in the form of chopped strand, compressed mass, pellet (pelletization) and granule can also be used. Among these, fillers in the form of powder, compressed mass and granule are preferable.

The inorganic filler (D) may also be a mixture of two or more inorganic fillers providing the above-described average particle diameter (and aspect ratio) is satisfied on the whole.

The production method of the inorganic filler (D) is not particularly restricted and the inorganic filler (D) can be produced by publicly known various methods. When talc is used for example as the inorganic filler (D), talc having the specific average particle diameter and aspect ratio can be produced by pulverization or pelletization. Specifically, raw stone of talc is pulverized by an impact type pulverizer or a micron mill type pulverizer, thereafter, further pulverized by a jet mill, and classified, for example, by a cyclone or a micron separator. The aspect ratio and the average particle diameter of talc can be appropriately regulated by the pulverization apparatus and the pulverization time, and if needed, classification is performed to obtain talc having controlled form.

As the inorganic filler (D), those obtained by pulverizing raw stone may be used directly, or those at least partially subjected to a surface treatment may be used. For the surface treatment, various surface treating agents such as organic titanate-type coupling agents, organic silane coupling agents, modified polyolefins obtained by grafting an unsaturated carboxylic acid or its anhydride, fatty acids, fatty acid metal salts and fatty acid esters can be used. The surface treating agents may be used each singly, or two or more of them may be used in combination.

<Nucleating Agent (E)>

The polypropylene-based resin composition of the present invention may further contain a nucleating agent (E) as far as the object of the present invention is not impaired.

The nucleating agent (E) is used, for example, for the purpose of further improvement of dimension stability (lowering of linear expansion coefficient) and improvement of impact strength of a polypropylene-based resin composition and its molded article. As specific examples of the nucleating agent (E), compounds represented by the following chemical structural formula (2) and various nucleating agents such as inorganic agents, sorbitol type agents, carboxylic acid metal salt type agents and organic phosphate type agents are given.

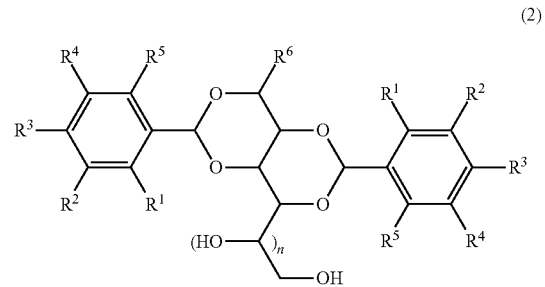

(2)

(in the formula (2), n is an integer of 0 to 2, $R^1$ to $R^5$ may be mutually the same or different and represent a hydrogen atom, an alkyl group having 1 to 20 carbon atoms, an alkenyl group, an alkoxy group, a carbonyl group, a halogen group or a phenyl group, and $R^6$ is an alkyl group having 1 to 20 carbon atoms.)

As the inorganic nucleating agent, for example, silica is given. As the sorbitol type nucleating agent, for example, 1,3,2,4-dibenzylidene-sorbitol, 1,3,2,4-di-(p-methyl-benzylidene)sorbitol, 1,3,2,4-di-(p-ethylbenzylidene)sorbitol, 1,3,2,4-di-(2',4'-di-methyl-benzylidene)sorbitol, 1,3-p-chlorobenzylidene-2,4-p-methyl-benzylidene-sorbitol and 1,3,2,4-di-(p-propylbenzylidene)sorbitol are given. As the carboxylic acid metal salt type nucleating agent, for example, aluminum-mono-hydroxy-di-p-t-butylbenzoate, sodium benzoate and calcium montanate are given. As the organic phosphate type nucleating agent, for example, sodium bis (4-t-butylphenyl) phosphate, sodium-2,2'-methylene-bis(4, 6-di-t-butylphenyl) phosphate and lithium-2,2'-methylene-bis(4,6-di-t-butylphenyl) phosphate are given. The nucleating agents (E) may be used each singly, or two or more of them may be used in combination.

Among these, compounds represented by the chemical structural formula (2) are preferable, from the standpoint of, for example, improvement of dimension stability (lowering linear expansion coefficient) and improvement of impact strength. Further, compounds in which n is an integer of 0 to 2, $R^1$, $R^2$, $R^4$ and $R^5$ are each a hydrogen atom, $R^3$ and $R^6$ may be mutually the same or different and represent an alkyl group having 1 to 20 carbon atoms are more preferable. Furthermore, compounds in which n is an integer of 0 to 2, $R^1$, $R^2$, $R^4$ and $R^5$ are each a hydrogen atom, $R^3$ is —$CH_3$, —$CH_2CH_3$, —$CH_2CH_2CH_3$, —$CH_2CH_2CH_2CH_3$, —$CH_2CH=CH_2$, —$CH(CH_3)CH=CH_2$, —$CH_2CH(X^1)$—$CH_2(X^2)$, —$CH_2CH(X^3)$—$CH_2CH_3$, —$CH_2CH(X^4)$—$CH_2OH$ or —$CH_2(OH)CH(OH)$—$CH_2OH$ (wherein, $X^1$ to $X^4$ are independently a halogen group), and $R^6$ is an alkyl group having 1 to 20 carbon atoms are particularly preferable.

The content of the nucleating agent (E) is not particularly restricted, and it is usually 0.05 to 0.5 parts by mass, preferably 0.1 to 0.4 parts by mass with respect to 100 parts by mass of the sum of the components (A) to (D). When the content of the nucleating agent (E) is 0.05 parts by mass or more, the effect of lowering low linear expansion coefficient tends to be more manifested. When it is 0.5 parts by mass or less, impact strength of a molded article and economy thereof tend to scarcely lower.

In the polypropylene-based resin composition, if necessary, other additives such as a thermal stabilizer, an antistatic agent, an anti-weather stabilizer, a light stabilizer, an anti-aging agent, an antioxidant, an aliphatic acid metal salt, a softener, a dispersant, a filler, a colorant, a lubricant or a pigment can be blended as far as the object of the present invention is not impaired. The mixing order of additives is arbitrary, and additives may be mixed at the same time, and it is also possible to adopt a multi-stage mixing method in which components are partially mixed before mixing of other components.

<Polypropylene-Based Resin Composition>

The polypropylene-based resin composition of the present invention contains 5 to 47 parts by mass of a propylene-based polymer (A), 0 to 30 parts by mass of a propylene homopolymer (B), 23 to 30 parts by mass of an ethylene-α-olefin copolymer (C), and 30 to 40 parts by mass of an inorganic filler (D), wherein, the total amount of components (A) to (D) is 100 parts by mass.

The polypropylene-based resin composition of the present invention preferably contains 7 to 35 parts by mass of a propylene-based polymer (A), 10 to 30 parts by mass of a propylene homopolymer (B), 23 to 28 parts by mass of an ethylene-α-olefin copolymer (C) and 32 to 40 parts by mass of an inorganic filler (D), wherein, the total amount of components (A) to (D) is 100 parts by mass.

The polypropylene-based resin composition of the present invention more preferably contains 8 to 28 parts by mass of a propylene-based polymer (A), 15 to 30 parts by mass of a propylene homopolymer (B), 24 to 28 parts by mass of an ethylene-α-olefin copolymer (C), and 33 to 38 parts by mass of an inorganic filler (D) wherein, the total amount of components (A) to (D) is 100 parts by mass.

The polypropylene-based resin composition of the present invention particularly preferably contains 10 to 22 parts by mass of a propylene-based polymer (A), 20 to 30 parts by mass of a propylene homopolymer (B), 24 to 27 parts by mass of an ethylene-α-olefin copolymer (C), and 34 to 37 parts by mass of an inorganic filler (D), wherein, the total amount of components (A) to (D) is 100 parts by mass.

The polypropylene-based resin composition of the present invention can be produced by blending the components (A) to (D) described above, and if necessary, the component (E) and other optional components. Components may be blended successively in arbitrary order, or may be mixed at the same time. It is permissible to adopt a multi-stage mixing method in which components are partially mixed before mixing of other components. Specifically, the composition can be produced by first blending the components (A) to (C) as resin components (organic compound component) in the polypropylene-based resin composition, then, adding and blending the component (D) and, if necessary, the component (E).

As the method of blending components, there are, for example, methods in which components are mixed or melt-kneaded at the same time or successively using a mixing apparatus such as a Bumbary mixer, a single screw extruder, a twin screw extruder and a high speed twin screw extruder.

The melt flow rate (230° C., load 2.16 kg) of the polypropylene-based resin composition of the present invention is usually 23 g/10 min or more, preferably over 23 g/10 min, and 50 g/10 min or less. When the melt flow rate is set in such a range, deterioration of paint appearance after injection molding can be suppressed.

The method of molding the polypropylene-based resin composition of the present invention is not particularly restricted, and various methods known as the molding method of a resin composition can be used. Particularly, the molded article obtained from the polypropylene-based resin composition of the present invention shows small dimension change by change of temperature and has excellent dimension stability. As the molding method thereof, particularly, injection molding and press molding are preferable.

The polypropylene-based resin composition of the present invention can be suitably used for various fields such as automobile interior and exterior members (particularly, automobile exterior members) and home electronics parts.

<Automobile Exterior Member>

The automobile exterior member of the present invention is a molded article obtained by injection molding or press molding the polypropylene-based resin composition of the present invention.

In the automobile exterior member of the present invention (and molded articles for other applications), linear expansion coefficients in both flow direction (machine direction: MD) and its orthogonal direction (thread direction: TD) are preferably $2.5 \times 10^{-5}$/° C. or more and $3.0 \times 10^{-5}$/° C. or less. This linear expansion coefficient is a value determined by measuring by a TMA method in a measurement range of −30° C. to 80° C.

In Dupont surface impact test according to JISK5600-5-3, the surface impact strength at −40° C. of a test piece composed of a molded article of the polypropylene-based resin composition of the present invention not having undergone painting is preferably 10 J or more, more preferably 12 J or more, particularly preferably 15 J or more.

The molded article obtained from the polypropylene-based resin composition of the present invention shows low linear expansion coefficient in a wide temperature range from extreme cold environment to burning environment, and simultaneously manifests impact resistance (surface impact resistance) of a propylene resin composition which was said to be weak so far under extreme cold environment. Therefore, the composition is suitable for application of molded articles used in environment under great temperature change such as automobile interior and exterior members, particularly, automobile exterior members. Specific examples of the automobile exterior members include a bumper, a side molding, a back door, a fender and a back panel.

EXAMPLES

The present invention will be illustrated further specifically based on examples below, but the present invention is not limited to these examples.

In examples and comparative examples, measurement and evaluation of physical properties were conducted by the following methods.

[Melt Flow Rate (MFR) (g/10 Min)]

Melt flow rate was measured under conditions of a test load of 2.16 kg and a test temperature of 230° C., according to ISO 1133.

[Intrinsic Viscosity [η]]

About 20 mg of a sample was dissolved in 15 ml of decalin, and the specific viscosity $\eta_{sp}$ was measured in an oil bath of 135° C. To this decalin solution, 5 ml of decalin solvent was additionally added for dilution, and thereafter, the specific viscosity $\eta_{sp}$ was measured in the same manner. This dilution operation was further repeated twice, and the value of $\eta_{sp}/C$ when the concentration (C) was extrapolated 0 was determined as the intrinsic viscosity [η].

$$[\eta]=\lim(\eta_{sp}/C)(C \to 0)$$

[Amount of Decane-Soluble Part ($D_{sol}$) and Amount of Insoluble Part ($D_{insol}$)]

Into a glass measuring vessel, about 3 g of a sample [component (A)](measured to a unit of $10^{-4}$ g. The mass is expressed as $x_2$ (g) in the following formula.), 500 ml of n-decane and a small amount of a thermal stabilized soluble in n-decane were charged, and the mixture was heated up to 150° C. over a period of 2 hours while stirring with a stirrer under a nitrogen atmosphere to dissolve the sample, kept at 150° C. for 2 hours, then, gradually cooled down to 23° C. over a period of 8 hours. The liquid containing the resultant deposit was filtrated under reduced pressure through a glass filter of 25G-4 grade manufactured by Iwata Glass Industrial Co., Ltd. 100 ml of the filtrate was collected, and this was dried under reduced pressure to obtain a part of the decane soluble component, and this mass was measured to a unit of $10^{-4}$ g (this mass is expresses as $x_1$ (g) in the following formula). Using this measured value, the amount of decane-soluble part ($D_{sol}$) and amount of insoluble part ($D_{insol}$) at room temperature (namely 23° C.) were determined by the following formulae.

$$D_{sol}(\% \text{ by mass})=100 \times (500 \times x_1)/(100 \times x_2)$$

$$D_{insol}(\% \text{ by mass})=100-D_{sol}$$

[Bending Elastic Modulus (MPa)]

Bending elastic modulus was measured under the following conditions, according to ASTM D790.
    temperature: 23° C.
    test piece: 127 mm (length)×12.7 mm (width)×6.35 mm (thickness)
    bending speed: 30 mm/min
    span: 100 cm

[Linear Expansion Coefficient ($10^{-5}/°$ C.)]

Linear expansion coefficient was evaluated by a TMA method (measurement range: −30 to 80° C.), according to ASTM D 696. Specifically, a resin was injection-molded at a resin temperature of 210° C. and a mold temperature of 40° C. using a mold cavity having a length of 240 mm, a width of 80 mm and a thickness of 3 mm, to obtain a flat plate, and this was cut into a shape of 10×5×3 mm thickness which was used as a test piece.

[Dupont Impact Strength (J)]

The surface impact strength of the test piece not having undergone painting was measured at respective temperatures of −10° C., −20° C., −30° C. and −40° C., according to JIS K5600-5-3.

[Average Particle Diameter of Inorganic Filler]

The particle diameter value at an accumulated amount of 50% by mass read from the particle size accumulative curve measured by a laser diffraction method according to JIS R1620 and JIS R1622 was adopted as the average particle diameter.

[Aspect Ratio of Inorganic Filler]

A powder was photographed using an electronic microscope, the long diameter and the thickness of the powder were measured, and the average values thereof were calculated, and the aspect ratio was determined from the ratio of average particle diameter/average thickness.

[Production Example 1] Preparation of Propylene-Ethylene Block Copolymer (A-1)

(1) Preparation of Solid State Titanium Catalyst Component

Anhydrous magnesium chloride (95.2 g), decane (442 mL) and 2-ethylhexylalcohol (390.6 g) were reacted with heating at 130° C. for 2 hours, to obtain a uniform solution, and 21.3 g of phthalic anhydride was added into this solution, and the mixture was further mixed at 130° C. for 1 hours, to dissolve phthalic anhydride.

This uniform solution was cooled to room temperature, then, 75 mL of the uniform solution was dropped into 200 mL of titanium tetrachloride kept at −20° C. over a period of 1 hour. After completion of addition, the temperature of this mixed liquid was raised up to 110° C. over a period of 4 hours, and when reached 110° C., 5.22 g of diisobutyl phthalate (DIBP) was added, and stirring of the mixture was continued for 2 hours at the same temperature.

After completion of the reaction for 2 hours, the solid part was collected by thermal filtration, and this solid part was re-suspended in 275 mL of titanium tetrachloride, and thereafter, the mixture was heated again at 110° C. for 2 hours. After completion of the reaction, the solid part was collected again by thermal filtration, and washed sufficiently with decane and hexane of 110° C. until free titanium compound was not detected in the solution.

Detection of this free titanium compound was confirmed by the following method. The supernatant (10 mL) of the above-described solid catalyst component was collected by a syringe and injected into a 100 mL branched Schlenk tube previously purged with nitrogen. Next, the hexane solvent was dried by nitrogen flow, and further, the residue was dried in vacuum for 30 minutes. To this were added 40 mL of ion exchanged water and 10 mL of (1+1)sulfuric acid and the mixture was stirred for 30 minutes. This aqueous solution was transferred to a 100 mL measuring flask through a paper filter, subsequently, 1 mL of a concentrated $H_3PO_4$ solution as a masking agent of iron (II) ion and 5 mL of a 3% hydrogen peroxide aqueous solution as a coloring reagent of titanium were added, further, ion exchanged water was added up to 100 mL and this measuring flask was shaken, and after 20 minutes, absorbance at 420 nm was observed using UV and free titanium was washed and removed until this absorption was not observed.

The solid state titanium catalyst component prepared as described above was preserved as a decane slurry, and a part of this was dried to examine the catalyst composition. The composition of thus obtained solid state titanium catalyst component was composed of 2.3% by mass of titanium, 61% by mass of chlorine, 19% by mass of magnesium and 12.5% by mass of DIBP.

(2) Production of Pre-Polymerization Catalyst

The above-described solid state titanium catalyst component (100 g), triethylaluminum (131 mL), diethylaminotriethoxysilane (37.3 ml) and heptane (14.3 L) were charged into an autoclave having an internal volume of 20 L equipped with a stirrer, and 1000 g of propylene was added while keeping the internal temperature at 15 to 20° C., and they were reacted for 120 minutes while stirring. After completion of polymerization, the solid component was left to precipitate, and removal of the supernatant and washing with heptane were conducted twice. The resultant pre-polymerization catalyst was resuspended in purified heptane, and the concentration was adjusted with heptane so that the concentration of the solid catalyst was 1.0 g/L, to obtain a pre-polymerization catalyst slurry.
(3) Main Polymerization To a jacketed recirculatory tubular polymerization apparatus having an internal volume of 58 L were continuously supplied 43 kg/hr of propylene, 256 NL/hr of hydrogen, 0.49 g/hr of the pre-polymerization catalyst slurry produced in the above-described (2) as a solid state titanium catalyst component, 4.5 mL/hr of triethylaluminum and 1.8 mL/hr of diethylaminotriethoxysilane, and polymerization was conducted in the flooded state with no vapor phase. The temperature of the tubular polymerization apparatus was 70° C. and the pressure was 3.57 MPa/G.

The resulting slurry was supplied to a vessel polymerization apparatus provided with a stirrer having an internal volume of 100 L, and polymerization was further conducted. To the polymerization apparatus, propylene was supplied at a flow rate of 45 kg/hr and hydrogen was supplied such that the hydrogen concentration of the vapor phase part became 8.8 mol %, and the polymerization was conducted at a polymerization temperature of 68° C. and a pressure of 3.36 MPa/G.

Then, the resultant slurry was transferred to a pipette having an internal volume of 2.4 L, where the slurry was gasified to conduct solid-gas separation. Thereafter, a polypropylene homopolymer powder was supplied to a vapor phase polymerization apparatus having an internal volume of 480 L, wherein ethylene/propylene block copolymerization was conducted. Propylene, ethylene and hydrogen were continuously supplied such that the ethylene/(ethylene+propylene) became 0.20 (molar ratio) and the hydrogen/ethylene became 0.0031 (molar ratio), as the gas composition in the vapor phase polymerization apparatus, and the polymerization was conducted at a polymerization temperature of 70° C. and a pressure of 1.40 MPa/G.

Then, the resultant propylene-based block copolymer was dried in vacuum at 80° C. In the propylene-ethylene block copolymer (A-1) obtained as described above, the MFR (230° C., load 2.16 kg) was 80 g/10 min, the amount of a decane-soluble part (propylene-ethylene copolymer component) (a1) was 7% by mass, the amount of a decane-insoluble part (propylene homopolymer component) (a2) was 93% by mass, and the intrinsic viscosity [η] of a decane-insoluble part (a2) was 7.5 (dl/g).

[Production Example 2] Preparation of Propylene Homopolymer (B-2)

First, a pre-polymerization catalyst slurry was obtained in the same manner as in (1) Preparation of solid state titanium catalyst component and (2) Production of pre-polymerization catalyst of Production Example 1.
(3) Main Polymerization To a vessel polymerization apparatus having an internal volume of 1000 L equipped with a stirred were continuously supplied 131 kg/hr of propylene, 0.70 g/hr of the pre-polymerization catalyst slurry as a transition metal catalyst component, 19.6 mL/hr of triethylaluminum and 4.2 mL/hr of diethylaminotriethoxysilane, hydrogen was supplied so that the hydrogen concentration of the vapor phase part was 5.3 mol %, and polymerization was conducted at a polymerization temperature of 75° C. and a pressure of 3.5 MPa/G.

The resultant slurry was transferred to a vessel polymerization apparatus having an internal volume of 500 L equipped with a stirrer, and polymerization was further conducted. To the polymerization apparatus, propylene was supplied at a rate of 30 kg/hr, hydrogen was supplied so that the hydrogen concentration of the vapor phase part was 3.9 mol %, and polymerization was conducted at a polymerization temperature of 74.5° C. and a pressure of 3.4 MPa/G.

Then, the resultant slurry was transferred to a vessel polymerization apparatus having an internal volume of 500 L, and polymerization was further conducted. To the polymerization apparatus, propylene was supplied at a rate of 20 kg/hr, hydrogen was supplied so that the hydrogen concentration of the vapor phase part was 3.4 mol %, and polymerization was conducted at a polymerization temperature of 73° C. and a pressure of 3.4 MPa/G.

Then, the resultant slurry was deactivated, gasified, then, gas-solid separation was conducted. The resultant propylene homopolymer was dried in vacuum at 80° C. MFR (230° C., load 2.16 kg) of thus obtained propylene homopolymer (B-2) was 210 g/10 min.

[Production Example 3] Preparation of Propylene Homopolymer (B-1)

A solid state titanium catalyst component was obtained in the same manner as in (1) Preparation of solid state titanium catalyst component of Production Example 1.
(2) Production of Pre-Polymerization Catalyst The solid state titanium catalyst component (100 g), triethylaluminum (39.3 mL) and heptane (100 L) were charged into an autoclave having an internal volume of 200 L equipped with stirrer, and 600 g of propylene was added while keeping the internal temperature at 15 to 20° C., and they were reacted for 60 minutes while stirring, to obtain a pre-polymerization catalyst slurry.
(3) Main Polymerization To a jacketed recirculatory tubular polymerization apparatus having an internal volume of 58 L, 43 kg/hr of propylene, 177 NL/hr of hydrogen, 0.58 g/hr of the pre-polymerization catalyst slurry produced in (2) as a solid state titanium catalyst component, 3.1 ml/hr of triethylaluminum and 3.3 ml/hr of dicyclopentyldimethoxysilane were continuously supplied, and polymerization was conducted in the flooded state with no vapor phase. The temperature of the tubular polymerization apparatus was 70° C. and the pressure was 3.53 MPa/G.

The resultant slurry was transferred to a vessel polymerization apparatus having an internal volume of 100 L equipped with a stirrer, and polymerization was further conducted. To the polymerization apparatus, propylene was supplied at a rate of 45 kg/hr, and hydrogen was supplied so that the hydrogen concentration of the vapor phase part was 3.2 mol %, and polymerization was conducted at polymerization temperature of 70° C. and a pressure of 3.28 MPa/G.

Then, the resultant propylene homopolymer was dried in vacuum at 80° C. MFR (230° C., load 2.16 kg) of thus obtained propylene homopolymer (B-1) was 30 g/10 min.

In examples and comparative example, TAFMER (registered trademark) A4050S manufactured by Mitsui Chemicals, Inc. (ethylene content=80 mol %, 1-butene content=20 mol %, MFR (230° C., load 2.16 kg)=6.7 g/10 min, density=0.862 g/cm$^3$) was used as the ethylene-α-olefin copolymer (C-1).

In examples and comparative example, the following four talcs (D-1) to (D-4) were used as the inorganic filler (D).
talc (D-1):
average particle diameter (laser diffraction method)= 4.3 μm, aspect ratio (SEM measurement)=6.7 talc (D-2):
 average particle diameter (laser diffraction method)= 3.7 μm, aspect ratio (SEM measurement)=9.0
talc (D-3):
 average particle diameter (laser diffraction method)= 4.5 μm, aspect ratio (SEM measurement)=9.0
talc (D-4):
 average particle diameter (laser diffraction method)=12 μm, aspect ratio (SEM measurement)=15.3

In examples, calcium 1,2-cyclohexanedicarboxylate (trade name: Hyperform HPN-20E, manufactured by Milliken Japan K.K.) was used as the nucleating agent (E-1).

Examples 1 to 4, Comparative Examples 1 to 3

The propylene-based polymer (A), the propylene homopolymer (B), the ethylene-α-olefin copolymer (C), the inorganic filler (D) and the nucleating agent (E) were mixed according to blending amounts shown in Table 1, and extruded by a twin screw extruder (TEX (registered trademark) 30a, manufactured by The Japan Steel Works, Ltd.) under conditions of a cylinder temperature of 180° C., a screw rotation speed of 750 rpm and a discharge amount of 60 kg/h, to obtain a polypropylene-based resin composition.

The physical properties of an injection molded article (test piece) produced from the resultant each polypropylene-based resin composition are shown in Table 1.

however, since the average particle diameter and the aspect ratio of the talc (D-4) are too large, surface impact resistance at low temperature was remarkably poor. In such a molded article, defects of aperture quality can be avoided, however, it is supposed that it becomes difficult to avoid breakage of the outer plate of an automobile by collision of small masses such as ice fragments to the car body often encountered when driving a vehicle under extreme cold environment.

INDUSTRIAL APPLICABILITY

The polypropylene-based resin composition of the present invention is useful, for example, as a material of molded articles in various fields such as automobile interior and exterior members such as a bumper, a side mall, a back door, a fender and a back panel, domestic products, and home electronics parts, and particularly, can be suitably used for the use application of automobile exterior members.

The invention claimed is:

1. A polypropylene-based resin composition comprising
  5 to 47 parts by mass of a propylene-based polymer (A) containing a decane-soluble part (a1) and a decane-insoluble part (a2) and having a melt flow rate measured at 230° C. and a load of 2.16 kg of 50 to 150 g/10 min and an amount of the decane-soluble part (a1) of 6 to 15% by mass, the propylene-based polymer (A) being a block copolymer obtained from propylene and ethylene, the decane-soluble part (a1) being an ethylene-propylene copolymer component and the decane-insoluble part (a2) being a propylene homopolymer component,
  20 to 30 parts by mass of a propylene homopolymer (B) having a melt flow rate measured at 230° C. and a load of 2.16 kg of 10 to 500 g/10 min,
  23 to 30 parts by mass of an ethylene-α-olefin copolymer (C) which is a random copolymer composed of ethylene and an α-olefin having 4 to 8 carbon atoms, and has a density of 0.850 to 0.890 g/cm$^3$ and a melt flow rate measured at 230° C. and a load of 2.16 kg of 0.5 to 30 g/10 min, and
  30 to 40 parts by mass of an inorganic filler (D) having an average particle size of over 3.0 μm and 4.8 μm or less, and an aspect ratio of 6.7 or more and less than 15,

TABLE 1

| | | | (unit) | Ex. 1 | Ex. 2 | Ex. 3 | Ex. 4 | Comp. Ex. 1 | Comp. Ex. 2 | Comp. Ex. 3 |
|---|---|---|---|---|---|---|---|---|---|---|
| Blending Composition | Component (A) | A-1 | parts by mass | 13 | 16 | 13 | 13 | 16 | 13 | 13 |
| | Component (B) | B-1 | parts by mass | 10.5 | 15.5 | 10.5 | 10.5 | 25 | 16.5 | 10.5 |
| | | B-2 | parts by mass | 16 | 8 | 16 | 16 | 3.5 | 16 | 16 |
| | Component (C) | C-1 | parts by mass | 25.5 | 25.5 | 25.5 | 25.5 | 20.5 | 25.5 | 25.5 |
| | Component (D) | D-1 | parts by mass | 35 | 35 | | | 35 | 29 | |
| | | D-2 | parts by mass | | | | 35 | | | |
| | | D-3 | parts by mass | | | 35 | | | | |
| | | D-4 | parts by mass | | | | | | | 35 |
| | Component (E) | E-1 | parts by mass | | 0.3 | | | | | |
| Condition of Composition | MFR (230° C., 2.16 kg) | | g/10 min | 29 | 25 | 26 | 26 | 24 | 35 | 21 |
| Physical Property of Molded Article | Bending Elastic Modulus | | Mpa | 2710 | 2840 | 2910 | 2930 | 3250 | 2400 | 3160 |
| | Linear Expansion Coefficient | | ×10$^{-5}$/° C. | 3.0 | 2.9 | 3.2 | 3.0 | 4.1 | 3.5 | 2.6 |
| | Dupont Impact Strength | −10° C. | J | >29.4 | nd | >29.4 | >29.4 | nd | nd | >29.4 |
| | | −20° C. | J | >29.4 | nd | >29.4 | >29.4 | nd | nd | 25.0 |
| | | −30° C. | J | >29.4 | nd | 28.0 | >29.4 | nd | nd | 16.2 |
| | | −40° C. | J | 25.0 | nd | 16.2 | 17.7 | nd | nd | 7.4 |

Note)
In the table, nd denotes no mesurement.

As apparent from the results shown in Table 1, the molded articles of Examples 1 to 4 had smaller linear expansion coefficients (more excellent in dimension stability) than the molded articles of Comparative Examples 1 to 2. Further, the molded articles of Examples 1, 3 and 4 manifested surface impact strength (Dupont impact strength) with good balance at low temperature as compared with the molded article of Comparative Example 3.

It is guessed that the molded article of Comparative Example 1 could not decrease linear expansion coefficient since the amount of the ethylene-α-olefin copolymer (C-1) was small. The molded article of Comparative Example 2 could not decrease linear expansion coefficient since the amount of the talc (D-1) was small.

In the molded article of Comparative Example 3, excellent rigidity and low linear expansion coefficient are shown, wherein, the total amount of the components (A) to (D) is 100 parts by mass.

2. The polypropylene-based resin composition according to claim 1, wherein the intrinsic viscosity [η] of the decane-soluble part of the propylene-based polymer (A) is 2 to 9 dl/g.

3. The polypropylene-based resin composition according to claim 1, wherein the inorganic filler (D) is talc.

4. The polypropylene-based resin composition according to claim 1, which further comprises a nucleating agent (E) in an amount of 0.05 to 0.5 parts by mass with respect to 100 parts by mass of the sum of the components (A) to (D).

5. The polypropylene-based resin composition according to claim 1, wherein in Dupont surface impact test according to JISK5600-5-3, the surface impact strength at −40° C. of a test piece composed of a molded article of the polypropylene-based resin composition not having undergone painting is 10 J or more.

6. The polypropylene-based resin composition according to claim 1, which is used for automobile exterior members.

7. An automobile exterior member obtained by injection-molding or press-molding the polypropylene-based resin composition according to claim 6.

* * * * *